July 29, 1969  P. P. KING ET AL  3,458,289
CATALYTIC CONVERTER
Filed April 14, 1965  2 Sheets-Sheet 2

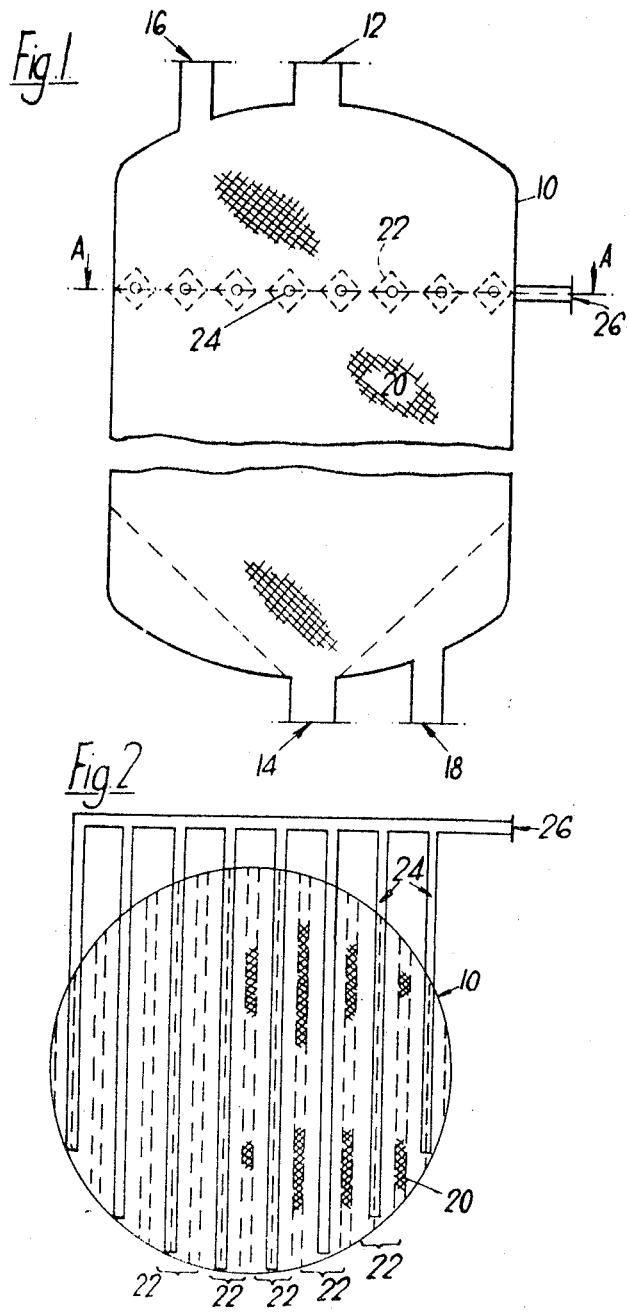

Inventors
PETER PATRICK KING
JOHN REGINALD POTTER
By
Cushman, Darby & Cushman
Attorneys

United States Patent Office 3,458,289
Patented July 29, 1969

---

3,458,289
CATALYTIC CONVERTER
Peter Patrick King and John Reginald Potter, Norton-on-Tees, England, assignors to Imperial Chemical Industries Limited, London, England, a corporation of Great Britain
Filed Apr. 14, 1965, Ser. No. 448,191
Claims priority, application Great Britain, Apr. 22, 1964, 16,716/64
Int. Cl. B01j 9/04
U.S. Cl. 23—288                                                7 Claims

ABSTRACT OF THE DISCLOSURE

A catalytic converter is provided with a main inlet for admitting reactant upstream of a stationary catalyst bed, and a secondary means for injecting further reactant or other fluid is provided in an intermediate area of the catalyst bed. The secondary means for injecting a reactant fluid functions to control the temperature of the reaction mixture in the catalyst bed, and the injecting means are in the forms of hollow bars having spargers therein. The hollow bars have sufficient perforations through them to receive, and mix, reactant from the main inlet with reactant injected through the spargers. The converter is especially useful for ammonia or methanol synthesis.

---

Figure 3:
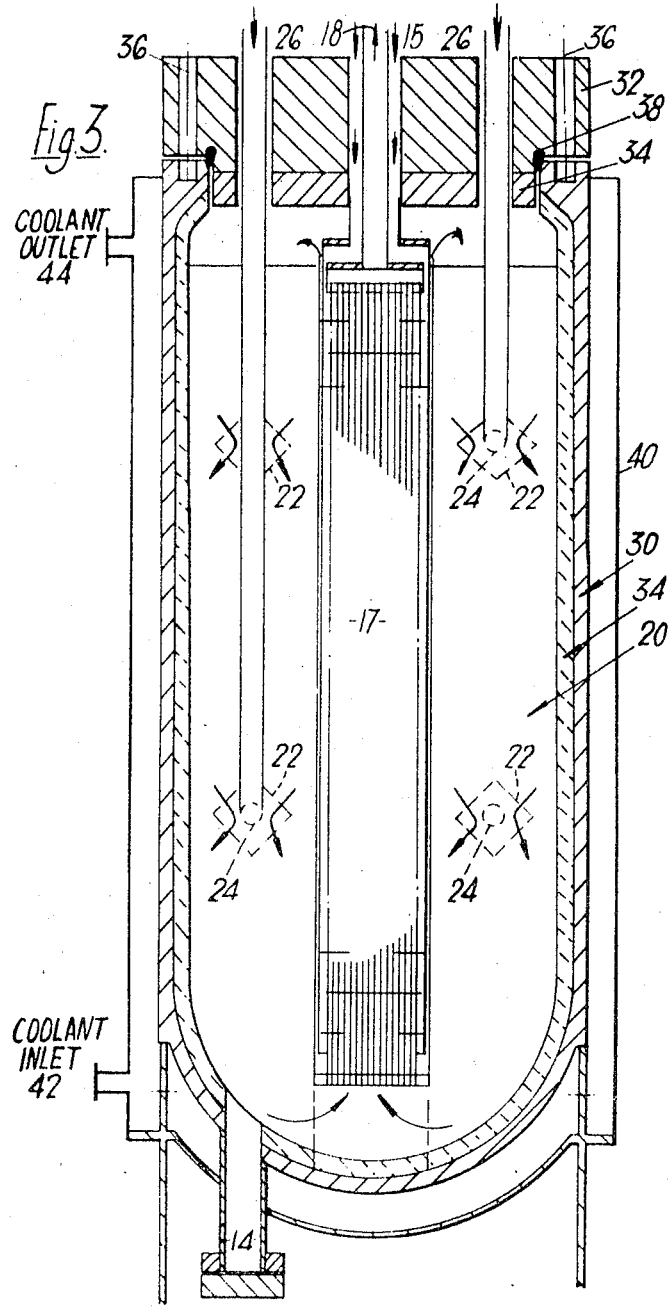

This invention relates to a catalytic converter equipped with means for introducing fluid at one or more points along the direction of reactant flow within it.

A catalytic converter is commonly used with a charge of catalyst filling part at least of its length, the reactants being fed in at one end of the catalyst charge and the products fed out at the other. Since most chemical reactions are accompanied by an evolution or absorption of heat the progress of the reactants through such a catalyst charge is accompanied by a rise or fall (respectively) in temperature as the extent of reaction increases. As a result, unless measures are taken to adjust it the temperature will deviate from the optimum for the maximum rate of reaction; and if overheating occurs locally, the catalyst may be in part deactivated. It has been proposed to control the temperature by using several small converters with intermediate cooling or heating (which is a costly arrangement) or by effecting cooling or heating between separate beds of catalyst inside a single converter (which makes it inconvenient to discharge and replace the catalyst). It has also been proposed to inject cold or hot fluid (respectively) at one or more intermediate positions along a single catalyst bed, but in so doing it has so far been difficult to achieve efficient mixing of the fluids.

The invention provides a catalytic converter with means for intermediate fluid injection, characterised in that each means for intermediate fluid injection comprises a number of perforated hollow bars each having associated with it a sparger (as hereinafter defined) for injecting the fluid, the hollow bars being large enough in cross section for their interiors to constitute mixing zones and close enough together or to the converter walls to cause a substantial proportion of reaction mixture to pass through their interiors.

The term "sparger" includes other devices which are equivalent in action to a sparger.

Each sparger can be on the upstream side of the hollow bar with which it is associated but is more conveniently inside it. The under-side of the bars can be open, if desired.

The size of the perforations in the hollow bars should be greater than that of the voids between the catalyst particles which are to be used in the converter, in order to make entry into them easy relative to continued passage through the catalyst. On the other hand the size should be small enough to prevent catalyst particles from entering the hollow bars. Preferably the perforations open downwards in order to lessen the risk of blocking of the holes by catalyst particles. The hollow bars are thus conveniently made of expanded metal, with its openings on at least the upper side of the bars facing downwards.

The hollow bars should be far enough apart to permit the ready passage of catalyst particles past them during the charging or discharging of the converter with catalyst: successive sets of bars can of course be mutually staggered. Their cross sectional elevation should by the same token be of such a shape as will permit the ready passage of catalyst. Very suitably this cross section is a triangle with its upward-facing sides at an angle of at least 45° to the horizontal. Suitably the cross section is a base-to-base pair of such triangles, especially a rhomb. It is found that the distance between the bars is preferably between 10 and 20 times the average largest dimension of the catalyst particles to be used.

It is largely a matter of convenience whether a large number of small mixing zones or a small number of large mixing zones is used: suitably however mixing zones of 12 to 18 inches width are used since these give rise to effective mixing without the excessive complication in piping which would result from using a larger number of smaller zones.

The successive sets of hollow bars are, for the sake of uniformity of fluid injection, preferably mutually parallel. The bars in any one set can be for example co-planar and secantially disposed, or circumferentially disposed, the latter arrangement being especially suitable for a converter having an axial heat exchanger, in particular a concrete-lined converter according to our co-pending application ICI Case B.17451 or U.S. application Ser. No. 444,772, filed Apr. 1, 1965 and now issued as Patent No. 3,396,865.

One preferred form of the invention is shown in FIGURES 1 and 2 of the accompanying drawings, in which FIGURE 1 shows in sectional elevation and FIGURE 2 shows in plan by means of a section on line A—A of FIGURE 1 a catalytic converter according to the invention. This converter is especially suitable for methanol synthesis at pressures in the range 30 to 120 atmospheres and temperatures up to 300° C., since it enables the high accuracy of temperature control required for such a process to be reliably obtained.

In these figures the converter shell 10 is equipped with a catalyst charging manhole 12 and discharging manhole 14, each fitted with a reactant entry port or exit port (16 and 18 respectively). The catalyst space 20 is crossed by a number of perforated hollow bars 22 12 inches wide (measured on the diagonal) and 3 inches apart each having inside it a sparger 24. Only one set of bars has been shown, but it will be understood that in practice several parallel sets would be used, spaced at intervals down the converter and mutually staggered. The hollow bars are made of expanded metal. Each set of spargers is fed from header pipe 26.

A second preferred form of the invention is shown in the accompanying drawings in FIGURE 3, which is an axial section of a catalytic converter for use at pressures suitable for ammonia synthesis.

The catalyst bed 20 of this converter, which is filled from the top of the converter and discharged through the discharge manholes 14 (of which only one is shown) occupies the annular-section space between the heat exchanger and the converter walls. Reactant gas is fed to the catalyst in two ways, namely via the main inlet 15 and heat exchanger 17 (shell-side), and via the intermediate cool gas injection system which consists of the mixing zones 22 (made of expanded metal) which are fed by spargers 24 which deliver the gas entering at 26. The upper mixing zones 22 and sparger 24 are C-shaped in plan view and the lower ones form a complete circle. The product gas leaves via the tube side of heat exchanger 17 and the outlet 18.

The converter shown is of the type described in our co-pending application already referred to, and consists of a pressure shell 30 and lid 32 each of which is lined with a dense refractory concrete layer 34. The lid is held in position by studs at 36, a seal being formed at 38. The pressure shell 30 is kept cool by liquid circulated into the jacket 40 via the inlet port 42 and the outlet port 44.

When the converter according to the invention is charged with catalyst the catalyst particles pass freely between the hollow bars until the space is filled. When the converter is in use the perforations in the hollow bars present to the moving reaction mixture a path which is less obstructed than the path between the catalyst particles, hence the mixture passes preferentially into the interiors of the bars and there mixes efficiently with the mixture admitted by the spargers and is brought to the required temperature.

I claim:
1. A catalytic converter comprising means for accommodating a stationary catalyst bed, main inlet means for admitting a main stream of reactant into the converter from upstream of the catalyst bed, and intermediate injector means for introducing additional fluid intermediately into the catalyst bed for controlling the temperature of the reaction mixture in the catalyst bed, each intermediate injector means further comprising a perforated hollow bar means having a sparger associated therewith for introducing said additional fluid into the hollow bar means, said hollow bar means being of sufficient size and number to receive a substantial proportion of the main stream of reactant into the interior spaces of said hollow bar means for mixing said main stream of reactant with the additional fluid introduced by said spargers.

2. A converter according to claim 1, in which each sparger is inside the hollow bar with which it is associated.

3. A converter according to claim 1, in which the hollow bar cross section is a triangle with its upward-facing sides at an angle of at least 45° to the horizontal.

4. A converter according to claim 1 in which the distance between the bars in any set is between 10 and 20 times the average largest dimension of the catalyst particles used.

5. A converter according to claim 1 in which successive sets of hollow bars are mutually parallel.

6. A converter according to claim 5 in which the bars in successive mutually parallel sets are in staggered relationship.

7. A converter according to claim 1 and including an axially disposed heat exchanger, and wherein the hollow bars are circumferentially disposed between the axial heat exchanger and the converter wall.

References Cited

UNITED STATES PATENTS 2,418,673   4/1947   Sinclair et al.

JAMES H. TAYMAN, JR., Primary Examiner

U.S. Cl. X.R.

23—198; 252—418; 260—449.5; 261—98